(12) United States Patent
Priebe (10) Patent No.: US 9,998,407 B2
(45) Date of Patent: Jun. 12, 2018

(54) SYSTEM AND METHOD FOR MANAGING ONLINE MESSAGES USING TRUST VALUES

(71) Applicant: Two Hat Security Research Corp., Kelowna (CA)

(72) Inventor: Christopher Andrew Priebe, Kelowna (CA)

(73) Assignee: TWO HAT SECURITY RESEARCH CORP., Toronto (CA)

( * ) Notice: Subject to any disclaimer, the term of this patent is extended or adjusted under 35 U.S.C. 154(b) by 190 days.

(21) Appl. No.: 14/174,645

(22) Filed: Feb. 6, 2014

(65) Prior Publication Data

US 2014/0222920 A1 Aug. 7, 2014

Related U.S. Application Data

(60) Provisional application No. 61/761,637, filed on Feb. 6, 2013.

(51) Int. Cl.
*G06F 15/16* (2006.01)
*H04L 12/58* (2006.01)
*G06F 21/50* (2013.01)

(52) U.S. Cl.
CPC .............. *H04L 51/00* (2013.01); *G06F 21/50* (2013.01); *H04L 51/12* (2013.01); *G06F 2221/2149* (2013.01)

(58) Field of Classification Search
None
See application file for complete search history.

(56) References Cited

U.S. PATENT DOCUMENTS

| | | | |
|---|---|---|---|
| 8,099,668 B2 | 1/2012 | Garbow et al. | |
| 8,140,528 B2 | 3/2012 | Priebe | |
| 8,145,708 B2 | 3/2012 | Biggs et al. | |
| 2004/0111479 A1* | 6/2004 | Borden | G06Q 10/107 709/206 |
| 2006/0095524 A1* | 5/2006 | Kay | G06Q 10/107 709/206 |
| 2006/0259543 A1 | 11/2006 | Tindall | |

(Continued)

FOREIGN PATENT DOCUMENTS

| | | |
|---|---|---|
| EP | 2174243 A2 | 4/2010 |
| WO | 2006055874 A2 | 5/2006 |

*Primary Examiner* — Brian Whipple
*Assistant Examiner* — Anthony T Rotolo
(74) *Attorney, Agent, or Firm* — Davis Wright Tremaine LLP; Heather M. Colburn (57) ABSTRACT

A computer-implemented method for managing text inputted by a user in an online communication program comprises: communicating with a user computing device or online communication program server to receive text inputted by the user; assigning a trust value to the inputted text, wherein the assigned trust value is one of least three trust values on a continuum of trust values comprising a first trust value associated with acceptable behavior, a second trust value associated with unacceptable behavior, and a third trust value associated with indeterminate behavior; determining available responses to the inputted text based on the assigned trust value and rules specified in a user trust matrix; and sending a response selected from the determined available responses to the user computing device or online communication program server.

17 Claims, 8 Drawing Sheets

(56) References Cited

U.S. PATENT DOCUMENTS

| | | | |
|---|---|---|---|
| 2008/0201411 A1* | 8/2008 | Paritosh | H04L 12/585 |
| | | | 709/203 |
| 2009/0228557 A1 | 9/2009 | Ganz et al. | |
| 2011/0077950 A1 | 3/2011 | Hughston | |
| 2012/0028606 A1* | 2/2012 | Bobotek | H04L 51/12 |
| | | | 455/411 |
| 2012/0036147 A1 | 2/2012 | Borst et al. | |
| 2013/0110748 A1 | 5/2013 | Talati et al. | |
| 2013/0117281 A1* | 5/2013 | Fleet | G06Q 10/10 |
| | | | 707/748 |
| 2013/0124644 A1* | 5/2013 | Hunt | H04L 51/12 |
| | | | 709/206 |

* cited by examiner

50 "you sh(it)"

52

54 "owww, my pen is hurts"

56 *Remember that there are younger people playing this site and we must set a good example for them. Your chat has been put into a more restricted mode. You can earn back the opportunity to speak more freely by being kind to other players and unlocking normal chat again. A moderator may still come by later and suspend or permanently ban your account later when they review this.*

58 "Hi Bob. Let's work together to solve this puzzle"

60 "Hi Bob. Let's work together to solve this puzzle"

62 *Congratulations, the more restrictive mode has been lifted. You are an the right track! Did you know that we reward positive players who are consistently encouraging others and making the game a positive place with more open chat? The rate you are going I bet you could earn that and really make this a great place.*

Figure 10

SYSTEM AND METHOD FOR MANAGING ONLINE MESSAGES USING TRUST VALUES

RELATED APPLICATIONS

This application claims priority to U.S. 61/761,637 filed on Feb. 6, 2013 and incorporates by reference the contents of that application in its entirety.

FIELD

This invention relates generally to a system and method for managing online messaging, and in particular to determining a trust value of a user's inputted message and controlling the display of the message based on the determined trust value.

BACKGROUND

Traditional online chat and message management systems rely on a list of acceptable ("white") and/or unacceptable ("black") list of words and phrases that are either allowed or not allowed to be used by chat users during online chat or messaging sessions. These systems fail to accurately predict all the creative ways a chat user will attempt to communicate. If any words are not on the list, the chat or message will either not go through or it will go through and potentially abuse other chatters. Thus, such systems may block words that are in fact benign or may allow unacceptable language into the chat session.

Further, traditional systems tend to be able to only categorize a phrase or word as always good or always bad. Such systems cannot determine when a phrase or word is sometimes bad, e.g. when used in a particular context. Usage of most words and phrases fit on a spectrum somewhere between good and bad depending on the context, culture and the player. Thus, traditional systems cannot accurately measure the relative trustworthiness of the word or phrase. Furthermore, since all words tend to be weighted similarly by traditional systems, the words cannot be triaged to indicate what is truly important. This leads to a high chance of error that requires human intervention.

It would be useful to provide a method and system for managing online messaging that is an improvement over traditional methods and systems.

SUMMARY

According to one aspect of the invention, there is provided a computer-implemented method for managing text input submitted by a user in an online communication program. The method comprises the steps of: (a) receiving a text input submitted by the user using the online communication program; (b) using a processor to assign a trust value to the text input, wherein the assigned trust value is a value on a continuum of trustworthiness comprising at least three trust values; (c) using the processor to determine available responses to the text input submission based on the assigned trust value and rules specified in a user trust matrix associated with the user; (d) transmitting a response to the text input submission selected from the determined available responses; and (e) adjusting the rules of the user trust matrix based on the assigned trust value of the text input. The available responses include allowing or denying display of the text input by the online communication program, and optionally sending positive or negative comments to the user regarding the acceptability of language used in the text input. The rules of the user trust matrix can be adjusted, for example, when the user submits text input having a specified trust value a specified number of times. An online communication program administration server can administer the online communication program used by the user. In such case, the method involves communicating with the administration server to receive the text input and to transmit the response.

This method can be encoded into program code that is stored on a computer readable medium or memory and executable by a processor. The computer readable medium or memory can form part of a computer system for managing text inputted by a user in an online communication program, that also comprises: a means for communicating with a user computing device or online communication program administration server to receive text input submitted by a user and to send a response to the user based on the text input submission; and a processor for executing the program code.

The continuum of trustworthiness can comprise a first group of one or more trust values associated with acceptable behaviour, a second group of one or more trust values associated with unacceptable behaviour, and a third group of one or more trust values associated with indeterminate or situationally determinate behaviour. The method can associate a user trust matrix having a default trust level to the user when the user is a new user. In the case of children's environment where safety is of high priority the cut-off of what is trustworthy would be configured as follows. The default trust level comprises a default set of rules that allow display of text input assigned the first trust value and that deny display of text input assigned the second or third trust values. Additionally, the step of adjusting the rules of the user trust matrix also adjusts a trust level of the user trust matrix, wherein the trust level is selected from a group comprising a more-trusted trust level and a less-trusted trust level. A user trust matrix having a more-trusted trust level includes rules allowing display of text input assigned the first or second trust values and denying display of text input assigned the third trust value, and a user trust matrix having a less-trusted trust level includes rules allowing display of text input assigned the first trust value and denying text input assigned the second or third trust values.

The step of using a processor to assign a trust value to the text input can comprise parsing the text input into one or more slots, associating one or more n-grams with the one or more slots ("parsed n-grams"), assigning a trust value to one or more of the parsed n-grams, then assigning a trust value to the inputted text based on the assigned trust value of the one or more parsed n-grams. The parsed n-grams can comprise a group of unigrams wherein each unigram is associated with a slot; the parsed n-grams can also comprise one or more n-grams that are associated with one or more groups of slots. The step of parsing the text input can comprise normalizing one or more of the parsed n-grams. The step of assigning a trust value to one or more of the parsed n-grams can comprise providing a list of defined n-grams each having an associated trust value, assigning the associated trust value of a defined n-gram that matches a parsed n-gram and assigning the third trust value to a parsed n-gram when no defined n-gram matches the parsed n-gram.

The step of using a processor to assign a trust value to the text input further comprises determining a usage context of the text input, assigning a confidence value based on the determined usage context, and assigning a trust value to the inputted text based on the assigned confidence value.

The method can further comprise determining the probability that the text input falls within a certain location on the continuum of trustworthiness using a natural language processing technique, then determining available responses to the text input submission based on the determined probability and the rules of the user trust matrix.

The step of normalizing one or more n-grams can comprise selecting a normalization algorithm from a group of normalization algorithms each having a specified chance of error, wherein the selected normalization algorithm is based on the user's trust level.

Multiple continuums of trustworthiness can be provided, comprising a general continuum of trustworthiness having at least three general trust values and at least one topical continuum of trustworthiness having at least three topical trust values. Accordingly, the user's trust matrix can comprise rules allowing display of the text input when the trust value of the text input corresponds to one or more specified allowable general or topical trust values.

DETAILED DESCRIPTION

The embodiments described herein relate generally to a computer-implemented method and system for managing messages posted by users of an online messaging program. In some embodiments, the online messaging program can be part of a multiplayer video game, or an online chat room. The system employs a trust based approach to assess the acceptability of text input submitted by the users, and based on the assessment, will determine a responsive action, such as allowing or denying the text input to be displayed to other users, or communicating negative or positive feedback to the user regarding the text input. The assessment is based on a trust value assigned to the text input, as well as on rules defined in a user trust matrix associated with the user. The communication can include an explanation about why the inputted text is unacceptable for display, a suggestion about alternative acceptable text inputs, and/or an indicator regarding the trust level status of the user.

The trust based approach used by the system comprises assigning a trust value to the text input, wherein the trust value is selected from a continuum of trust values. The continuum of trust values can be grouped into three general groups, namely a "white" group representing acceptable behaviour, a "black" group representing unacceptable behaviour, and a "grey" group representing indeterminate or situationally determinate behaviour. The trust based approach also comprises assigning a trust level to each user based of that user's trust matrix, wherein the trust matrix comprises rules governing the system's response to the user's text input based on the trust value assigned to the text input, as well as other actions such as governing the amount of free chat permitted by the user. A trust matrix having a more-trusted trust level will have rules that tend to allow the display of text inputs having white and grey trust values and disallow the display of text inputs having black trust values, whereas a trust matrix having a less-trusted trust level will tend to only allow the display of text inputs having white trust values, and disallow the display of text inputs having grey and black trust values. The rules in the user's trust matrix can be embodied in the form of a list of allowable trust values, i.e. the trust matrix will contain one or more rules each comprising a list of trust values that will allow the system to display the text input when the text input is assigned a trust value that matches one of the allowable trust values.

The rules of the user's trust matrix will be updated based on one or more text inputs from the user; for example, more restrictive rules (e.g. fewer allowable trust values) and a lower trust level will be imposed when the text input(s) contain unacceptable language, and more flexible rules and a higher trust level (e.g. more allowable trust values) will be awarded when the text input(s) contain acceptable language. A new user is assigned a default level trust matrix and can earn a more-trusted or less-trusted trust level with corresponding trust matrix rules based on the user's messaging behaviour, i.e. based on the acceptability or unacceptability of the user's text inputs.

Figure 1:
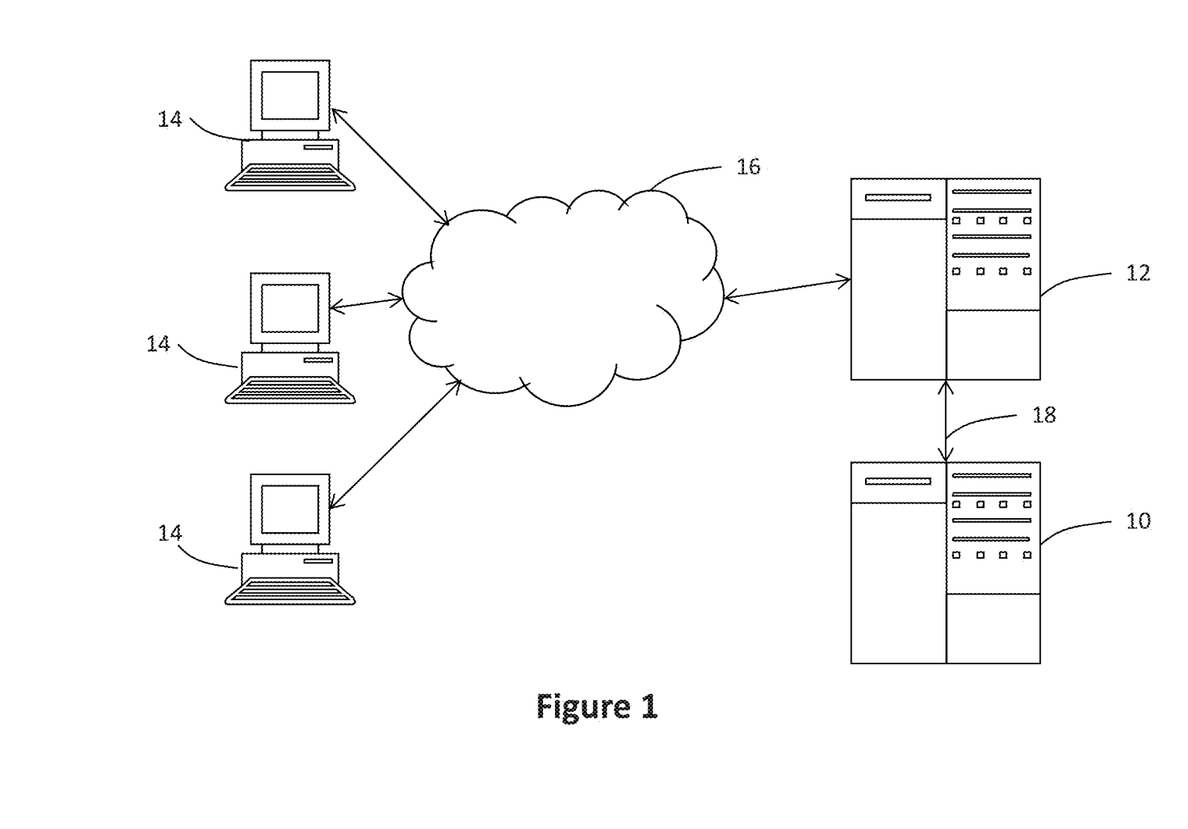
FIG. 1 is a block diagram of components of a message management system for managing online messages according to a first embodiment of the invention, wherein the system is communicative with a website administration server that in turn is communicative with multiple client computing devices via a network.

Referring to FIG. 1 and according to a first embodiment, a message management system and method comprise program code encoded on a computer readable medium ("message management program"), which is stored on a remote server 10 ("message management server") and executable by a processor on the message management server 10. The message management server 10 is communicative with another server 12 hosting a virtual chat room or video game ("host server") having messaging functionality; in the embodiments shown in FIG. 1, the host server is a website administration sever that hosts a web-based online multiplayer video game. Users operate client computing devices 14 such as personal computers, tablets, or smartphones to communicate with the host server 12 to submit text inputs into a text interface of a messaging program in the chat room or video game. In FIG. 1, the computing devices 14 communicate with the host server 12 via the internet 16, and the host server and message management server 10, 12 communicate via a local area network 18; however, the devices 14 and servers 10, 12 can communicate with each other using any kind of communications network, e.g. all can communicate via the internet, or, the functionality of the host server 12 and message management server 10 can be integrated into a single server (not shown).

Figure 2:
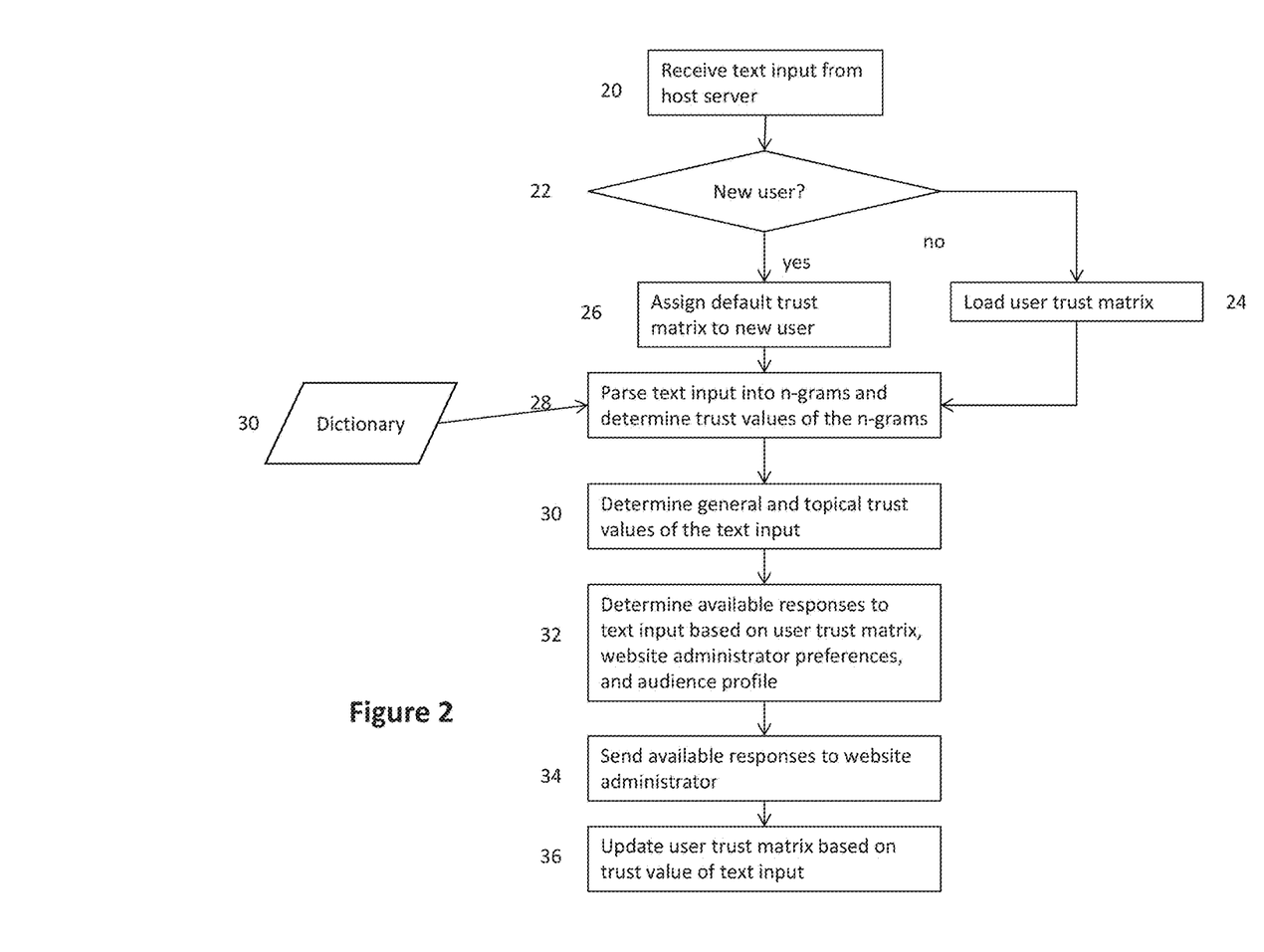
FIG. 2 is a flow chart of steps performed by a message management program stored on a memory of the message management system to determine the trustworthiness of text inputted by a messaging user, and to send a response to the user based on the determined trustworthiness.

Referring to FIG. 2, the message management program upon execution will perform a number of steps to assess the acceptability of text inputs by users of the messaging program. When a user submits a text input into a messaging program interface running on the user's computing device 14, the text input is transmitted to the host server 12, which forwards the text input to the message management server 10 (step 20) as part of a data packet. The data packet will also include other information including a unique user identifier that identifies the user who submitted the text input.

Figure 4:
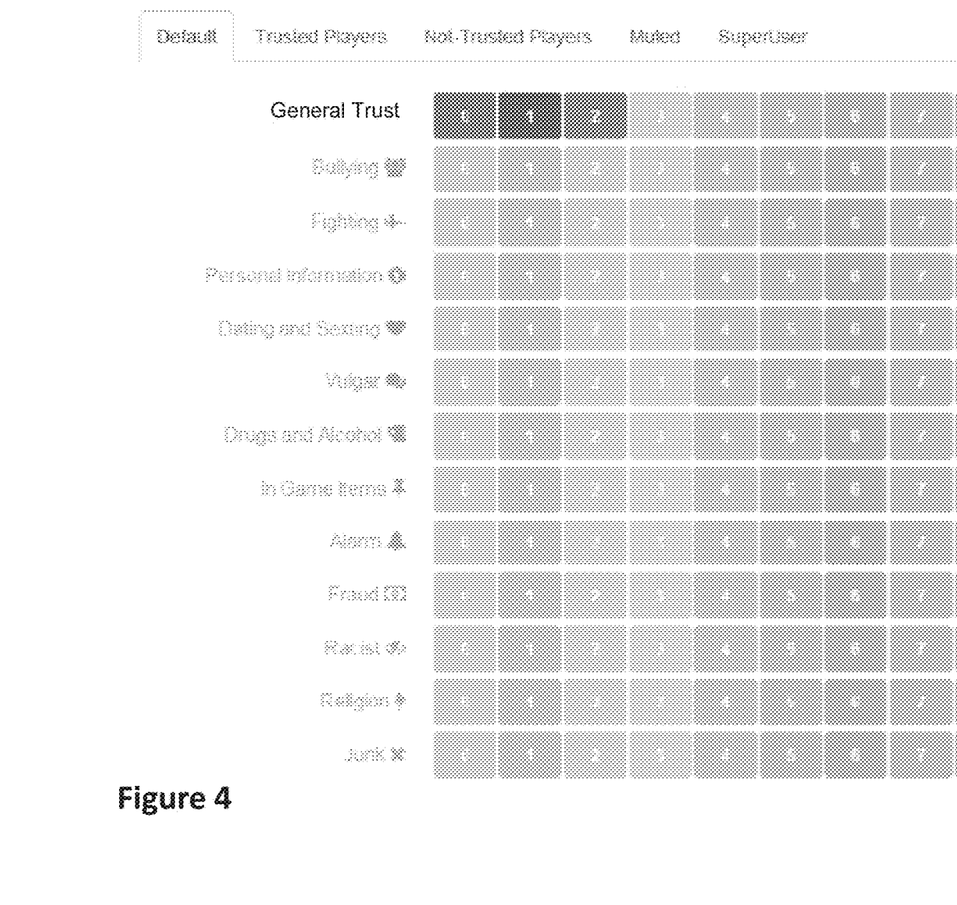
FIG. 4 is a schematic of a default user trust matrix comprising a set of rules governing actions available to the message management program in response to a user's text input, wherein the rules permit a user's text input having a general trust value of 0, 1 or 2 to be displayed.

Upon receipt of the data packet, the message management server 10 will determine whether the user is a new user or an existing user by comparing the unique user identifier to a list of user identifiers stored in a database module resident in or communicative with the message management server 10. Each user identifier stored in the database module has associated with it a user trust matrix containing rules governing the treatment of text input based on the trust values assigned to the text input, as will be discussed in more detail below. If the user identifier is found in the database module, the user is identified to be an existing user, and the message management program will load the user trust matrix associated with the found user identifier (step 24); if the user identifier cannot be found in the database module, the user is classified as a new user, and a default level user trust matrix (see for example the matrix shown in FIG. 4) is assigned to the new user and the new user's identifier and default level user trust matrix are stored on the database module (step 26). As will be discussed in more detail below, each user trust matrix will have one or more rules that each contain a list of allowable trust values, wherein the number of allowable trust values will depend on the trust level of the user.

The message management program then analyzes the user's text input contained in the data packet (step 28). The program can apply known natural language processing algorithms to normalize the text input and parse the text input into individual slots, wherein each slot is defined a group of one or more characters separated by spaces. The slots are then associated with one or more n-grams, i.e. a contiguous sequence of n items from the text input, and which can comprise phonemes, syllables, letters, or words, in a manner that is known in the art. A unigram can be associated with each slot, and an n-gram can be associated with a group of slots. Known normalization algorithms that can be applied here include algorithms to convert mixed case words into lower case, to correct misspelled words having inverted letters, and to remove symbols from words. Once the text has been normalized and parsed, each parsed n-gram is compared to a list of defined n-grams in a dictionary module resident on or communicative with the message management server 10 (step 30). Each of the defined n-grams has an associated general trust value that reflects the general degree of acceptability of the n-gram to the intended audience, and optionally one or more associated topical trust values that reflects the acceptability of the n-gram when used in a particular context or topic (the n-gram and its associated trust values are herein referred to as "tokens"). Each topical trust value is associated with a particular topic tag. The topic tags can include any number of different topics, including those shown in FIG. 4, namely: "bullying", "fighting", "personal information", "dating and sexting", "vulgar", "drugs and alcohol", "in game items" (for messaging in video games), "alarm", "fraud", "racist", "religion", and "junk".

By providing the ability to assign one or more separate topical trust values for each defined n-gram in the dictionary module, the message management program should be able to provide a more accurate assessment of the trustworthiness of text inputs, as certain n-grams can be more or less acceptable when used in a particular topical context. The defined n-grams are assigned one or more topic tags and associated topical trust values manually (by humans), and can be done for example by an operator of the host server 12 by tagging words or phrases encountered during chat or game sessions with an appropriate topic tag and topical trust value. When a text input has a parsed n-gram that matches a defined n-gram in the dictionary module having one or more topic tags, the message management program will also assign one or more topical trust values to the text input.

Figure 3:
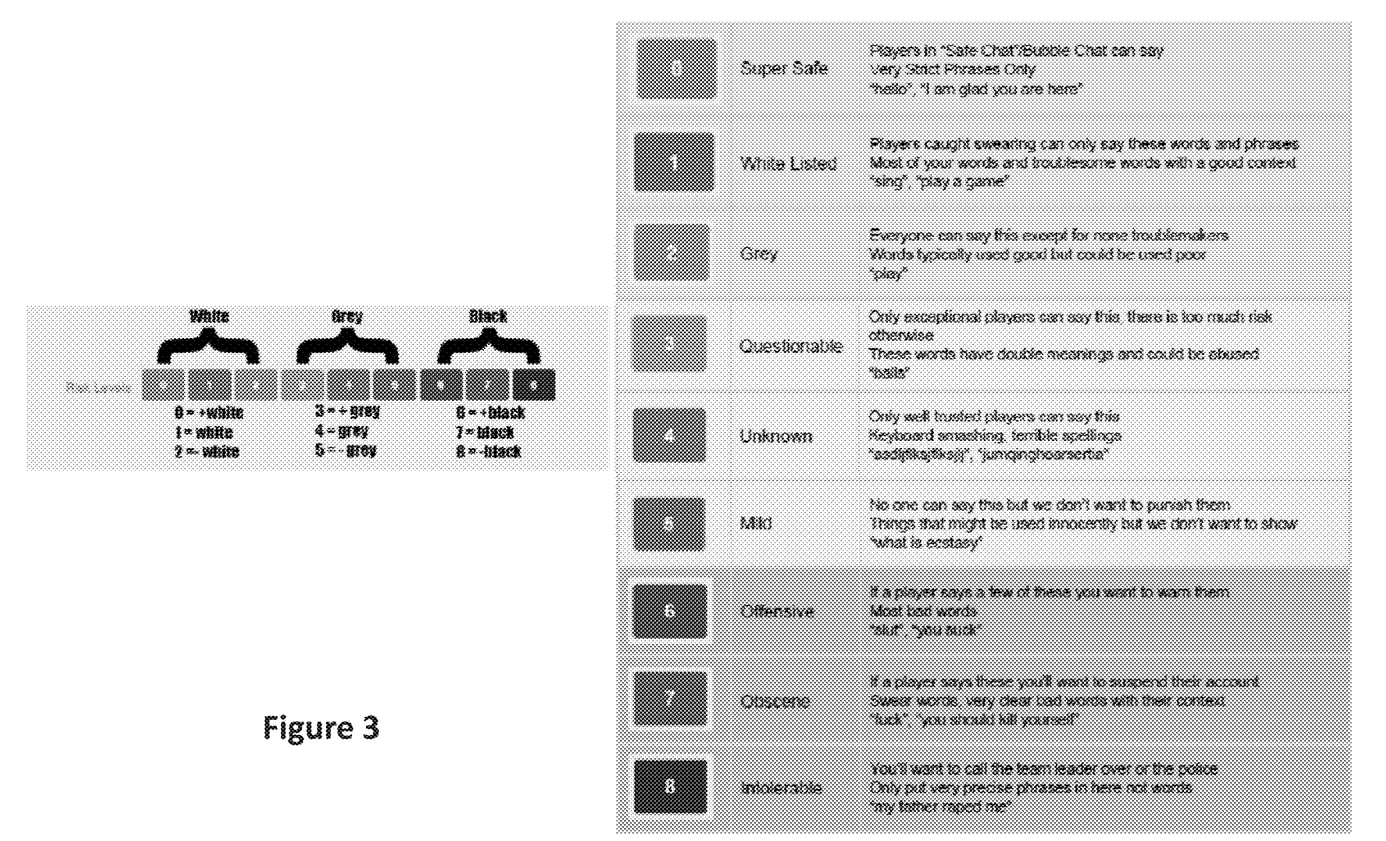
FIG. 3 is a schematic of a continuum of trustworthiness comprising multiple trust values, wherein each n-gram in a user's text input is assigned one of the trust values by the message management program.

Referring to FIG. 3, the general and topical trust values for each defined n-gram in the dictionary module 30 can be selected from a group of nine available trust values along a continuum of trustworthiness. However, other embodiments can feature a different number of trust values in the continuum depending on the desired assessment granularity preferred by an operator; at a minimum, a continuum of trustworthiness should have at least three distinct groups of trust values, namely a "white" group of trust values representing safe or acceptable language, a "black" group of trust values representing unsafe or unacceptable language, and a "grey" group of trust values representing indeterminate or situationally-dependent language. In this embodiment, the nine available trust values consist of a group of three trust values (0, 1, 2) classified as white values, a group of three trust values (3, 4, 5) classified as grey values, and a group of three trust values (6, 7, 8) classified as black values. The nine trust values are labelled, from most acceptable to least acceptable: "super safe" (0), "white listed" (1), "grey" (2), "questionable" (3), "unknown" (4), "mild" (5), "offensive" (6), "obscene" (7), and "intolerable" (8). Note that these labels are intended to merely be convenient identifiers for each trust value and should not be interpreted as literal definitions of the acceptability of text assigned one of these values.

The list of defined n-grams in the dictionary module can be constructed manually by humans, or automatically using known natural language algorithms. In this embodiment, the assignment of trust values to each n-gram in the dictionary list is done manually, and can be done by an operator of a virtual chat room or online multiplayer game by identifying language used during chat sessions or game play as being acceptable or unacceptable then adding such language to the dictionary and assigning a trust value thereto.

When the text input contains n-grams that are not present in the dictionary module, the message management program will assign a grey trust value to the n-gram indicating that the meaning of the n-gram is unknown or indeterminate. The program can also include steps to alert a human operator to conduct a review of the text input and manually assign a trust value thereto.

Figure 8:
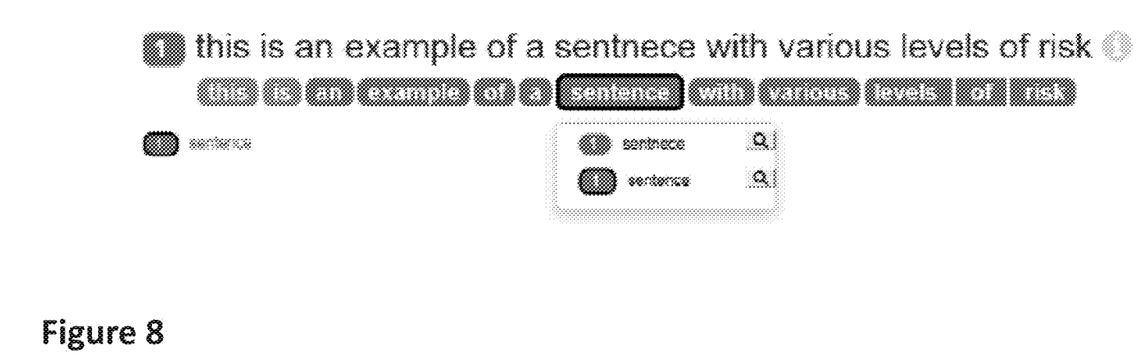
FIG. 8 depicts an exemplary output by the message management program wherein a general trust value has been assigned to each unigram in a line of normalized text input, wherein each unigram is associated with a slot in the line of normalized text input.

After the message management program has executed step 30, an output will be produced wherein the text input has been parsed into unigrams (individual n-grams) wherein each unigram is associated with a slot, and each unigram has been assigned one or more trust values. Referring to FIG. 8, the example text input "this is an example of a sentence with various levels of risk" has been processed by the message management program, which generates a group of slots (illustrated as boxes in FIG. 8), and a unigram for each slot with an associated general trust value; in this example, the unigram "sentence" has been assigned a general trust value of "1" indicating that this unigram is a word having low risk and high acceptability.

Figure 9:
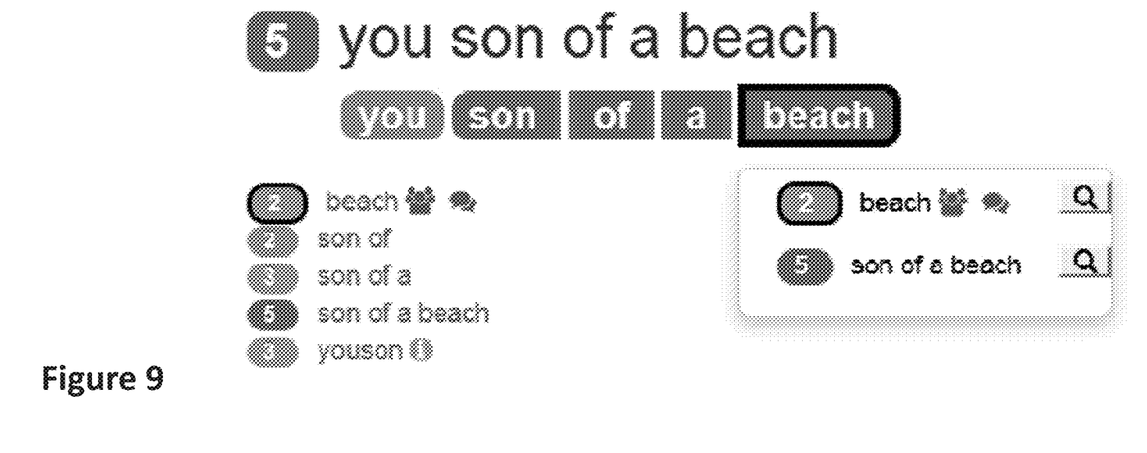
FIG. 9 depicts an exemplary output by the message management program, wherein a general trust value has been assigned to an n-gram associated with a group of slots in a line of normalized text input.

As noted above, the message management program will also associate an n-gram with a group of slots. Referring to FIG. 9, the example text input "you son of a beach" has been parsed into multiple unigrams including the word "beach" and an n-gram for the phrase "son of a beach". The message management program then compared each parsed n-gram against the corresponding list of defined n-grams in the dictionary module, and in this example, the dictionary module contained the n-gram "beach" which has been assigned a general trust value of 2 representing a borderline acceptable white trust value, and the n-gram "son of a beach" which has been assigned a general trust value of 5 representing relatively low acceptability, on the basis that this phrase is considered to be a disguised attempt to communicate the offensive phrase "son of a bitch".

Referring back to FIG. 2 and after the text input has been parsed and a trust value has been assigned to each parsed n-gram, the message management program assigns a general trust value to the entire text input based on the trust values assigned to the parsed n-grams (step 30). In one embodiment, the general trust value of the text input is the highest trust value assigned to an n-gram in the text input. In the example shown in FIG. 8, the text input "this is an example of a sentence with various levels of risk" has been assessed with a general trust value of 1, since the message management program determined that this text input only contained n-grams each with a general trust value of 1. On the other hand, in the example shown in FIG. 10, the message management program assigned a general trust value of 5 to the text input "you son of a beach" since the n-gram "son of a beach" had the highest assigned general trust value amongst the parsed n-grams.

Figure 5:
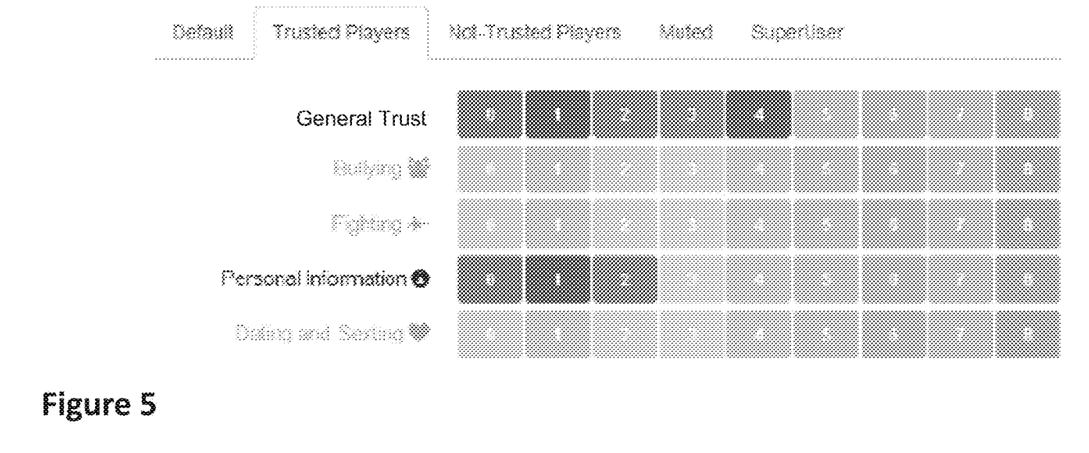
FIG. 5 is a schematic of a trusted user trust matrix comprising a set of rules including permitting a user's text input having a general trust value of 0 to 5 to be displayed, as well as inputted text having a personal information trust value of 0, 1 or 2 to be displayed.
Figure 6:
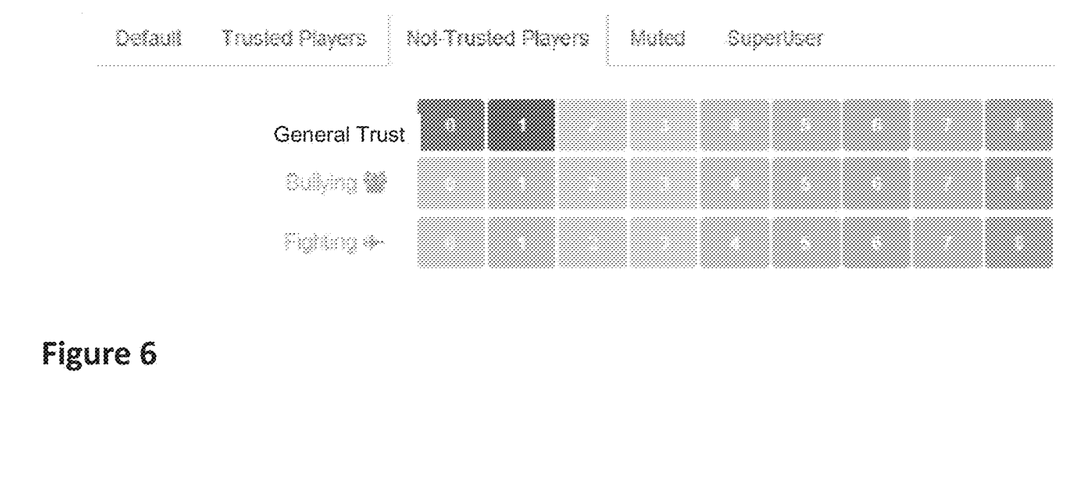
FIG. 6 is a schematic of a non-trusted user trust matrix, comprising a set of rules that only permit a user's text input having a general trust value of 0 or 1 to be displayed.

Once the text input has been assigned with a general trust value and any applicable topical trust value, the message management program refers to the user's trust matrix to determine what actions the program can take in response to the text input (step 32). For a new player having a default level user trust matrix such as the one shown in FIG. 4, the rules of the default level user trust matrix only permit a text input to be displayed if the text input has a general trust value of 0, 1, or 2, and no topical trust values; in other words, the message management program will deny display of any text input having a general trust value of 3 or greater or having any value of topical trust value, and in certain circumstances will also send a warning message to the user. If on the other hand the user is a previous user who has a more-trusted trust level, the user will have a trust matrix with more flexible rules like the one shown in FIG. 5 and be permitted to use language that has a larger range of white and grey general trust values and even language that has been assigned one or more topic tags with an associated topical trust value. Conversely, if the user is a previous user who has a less-trusted trust level, the user will have a trust matrix with more restrictive rules like the one shown in FIG. 6 and will be permitted to use language that has no topical trust values and which falls within a range of "white" trust values. This dynamically adjusting approach is distinctly different than prior art filtering systems, which only have static rules and do not dynamically adapt to the behaviour of the user.

Optionally, the message management program can include program code to calculate the probability that the assessed trust value of a text input falls inside or outside of the rules of the user's trust matrix, by implementing algorithms from known natural language processing techniques. For example, a simple supervised learning set can be created that describes the desired behaviour of users of various trust levels. Using standard models like Katz Back-Off Models, the algorithm compares a submitted text input to a supervised set and outputs a probability of the two being similar. The outputted probability represents a trust value along a continuum of trust values between 0 and 1, wherein 0 represents acceptable behaviour and a 1 represents unacceptable behaviour. The rules of the user trust matrix in this case are adjusted to determine whether a text input is acceptable or unacceptable for display based on the probability-based trust value assigned to the text input. The present method can thus be used without any traditional classification of words, which is a distinct difference from approaches taken by traditional prior art systems. Whereas traditional models would have to manually rank each word as "good" or "bad", the present method is able to break words and their surrounding words into a probability. So, if a word like "of beaches" appears 3 times in a corpus of 1 million sample troublemaker conversations, the word scores a 0.000003 whereas none in the other sources it indicates it may be of similar type. The distinction then is that known trustworthy and untrustworthy users can shed light on new conversations without having to score individual words as done by prior art approaches. Only past conversations or thread would need to be sampled and used as a training set.

Figure 10:
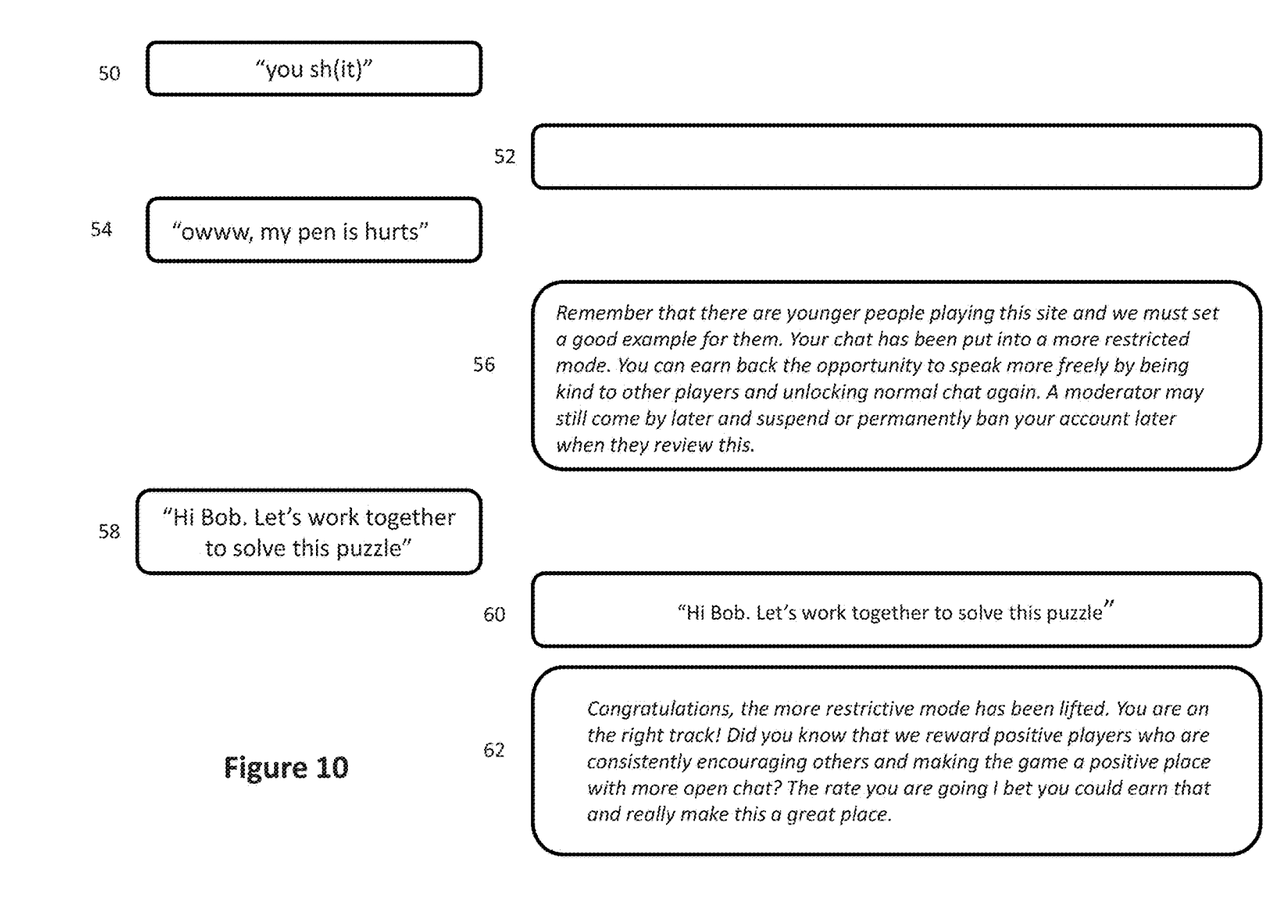
FIG. 10 is a schematic of a user messaging interface showing text inputs by a user and feedback from the message management program.

After the message management program has determined the available actions for the assessed text input, the program sends instructions to the host server 12 to take commensurate action (step 34). For text inputs that are assessed to be permissible for display, the message management program transmits instructions to the host server 12 to display the text input, and in certain circumstances to display a positive feedback message to the user. For text inputs that have been assessed to be impermissible for display, the message management program sends instructions to the host server 12 to not display the text input, and under certain circumstances, to display a negative feedback message to the user. The positive feedback message associated with permissible text inputs can be a congratulatory message that is sent when a user has previously submitted one or more unacceptable messages then submitted a specified number of acceptable messages. Conversely, the negative feedback message associated with impermissible text inputs can be a warning message that is sent after a user has submitted a message that has been denied a specified number of times. An example of such messages is shown in FIG. 10, wherein a user submits a text input 50 that is considered unacceptable by the message management program and which is denied display 52, then submits another message 54 that is considered to be unacceptable and then receives a warning message 56. The user then inputs messages that are considered to be acceptable 58, and in response, the message management program allows the message to be displayed 60, and sends a congratulatory message 62 to encourage the user to keep submitting acceptable messages.

Figure 7:
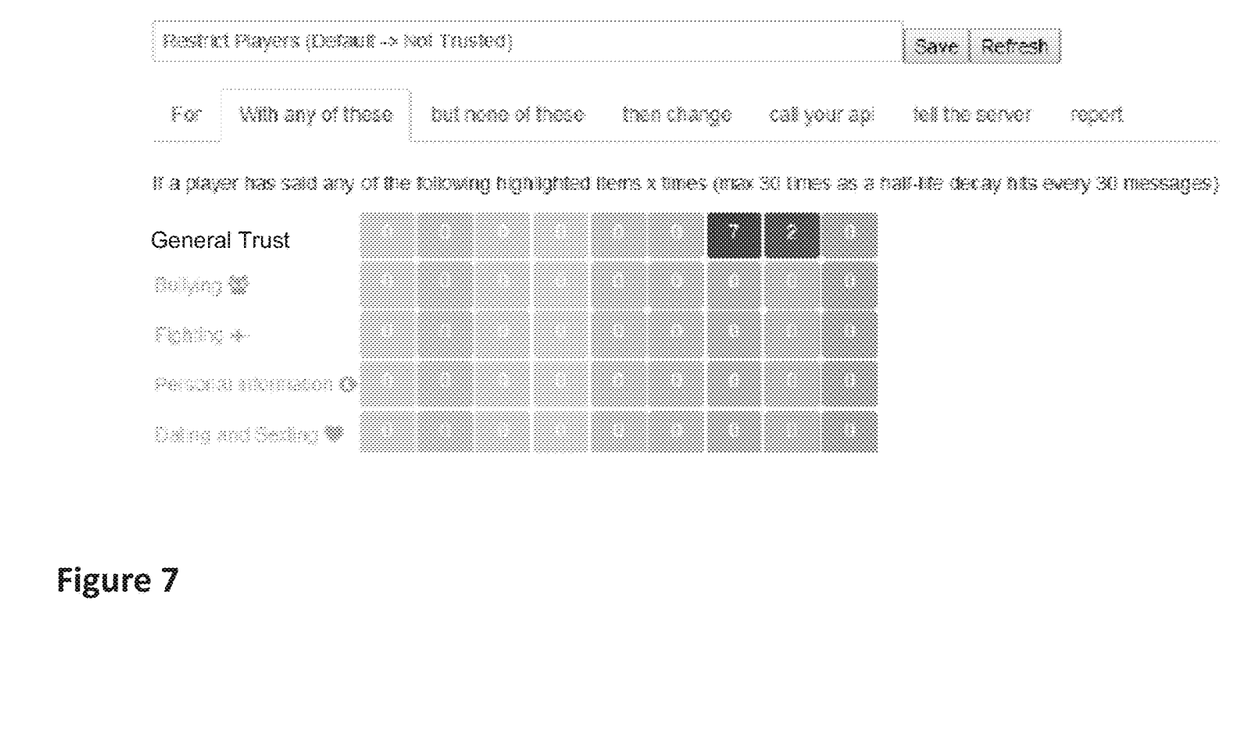
FIG. 7 depicts a procedure performed by the message management program to change the rules of a user's trust matrix when a user has inputted text having a specified trust value a specified number of times.

Referring back to FIG. 2, the message management program updates the user trust matrix based on the associated general and topical trust values for the text input (step 36). The message management program can be programmed with a number of different criteria that when met will cause the program to change the user's trust matrix rules. In this embodiment, the message management program is provided with a counter that records the number of times a user submits a text input having a specified trust value, and will change the user matrix rules when the counter reaches a specified number. For example and as shown in FIG. 7, the message management program can be programmed to impose more restrictive rules when the user submits seven messages that have a general trust value of 6 or two messages that have a general trust value of 7. Conversely, the message management program can be programmed to allow more flexible rules (e.g. allow display of text inputs that score a grey trust value) when the user submits a specified number of messages that have white general trust values.

As noted above, the message management program can utilize known natural language algorithms to normalize the text input. In some embodiments, the message management program is programmed to apply different normalization algorithms based on the user's trust matrix; in particular, the message management program will apply normalization algorithms that have a higher chance of error only when the user trust matrix indicates a higher user trust level. For example, a normalization algorithm which converts text to lowercase is useful to correct inadvertent typographical errors but can cause the program to miss users attempting to circumvent the system by disguising an offensive word as the capitalized portion of a larger word (e.g. pASS); thus, the message management program can be programmed to use such a normalization algorithm only when the user has a trust matrix indicating a more-trusted user.

The message management program can be additionally programmed to assign a confidence value to each n-gram or group of n-grams in the text input and determine whether to apply a normalization algorithm based on the assigned confidence value and the user's trust matrix. For example, a word that is misspelled by having one or more letters inverted (e.g. "spellign" vs. "spelling") can be simply an innocent typographical error by the user or an attempt by the user to hide an offensive word. The program will assign a high confidence value based on a number of criteria including how many steps of separation the inverted letters are from their correct positions ("lexical distance"), and the trust level indicating by the user's trust matrix. For instance, the program will assign a relatively low confidence value to the misspelled word when the user has a low trust level and the inverted letters have a high separation, which may result in the program not applying the normalizing algorithm to the text input and as a result the text input may be assigned an indeterminate trust value.

Optionally, the message management system is provided with means for determining whether a user is trying to get around the user's trust matrix rules. For example, the message management system can be programmed to monitor the user's text input and determine whether the user has failed a filter (rule) more than a defined number of times. If the user continues to fail the filter this indicates that the new text input the user submitted might be the same as the last text input. The system is programmed to measure the lexical distance of the characters used in the two text inputs and/or measure the similarity in meaning of words and sounds can determine the similarity of the two text inputs and determine whether the trust value of the earlier text input phrase is appropriate to assign to the new text input, by how much, and/or if more research is pending.

If a user submits a text input that passes the filter after failing it several times the message management system is programmed to assess whether the user changed the subject matter from that in previous text inputs, whether the previous text inputs are also of acceptable trust value (i.e. of low risk), or if the current text input is misfiled. The system will make a prediction on the risk and mark the confidence appropriately based on how authoritative the data it collected that formed the decision is. The idea here is that not only can the n-grams indicate a risk but if the system had to manipulate the text input in order to obtain an identifiable n-gram then the n-gram may be of higher risk. For example, consider an algorithm relating to spelling correction. The system can be programmed to count how many changes are made and provide a score of how much risk each change might add and then apply formulas such as dice_coefficient and levenshtein distance to create a number that represents the distance between the original and desired target. This can help select the best match. Secondly it will allow the system to consider if the changes pass the level of trust we allow for the user per the user trust matrix.

If the determined probability is high, the system can rank the new text input according to the known items within the same cluster of context. Later humans can moderate a sample of the data. False positives and negatives can be used as inputs into the algorithm to rebalance the weights used to form decisions on the data and the weight of the individual pieces of data themselves. If the determine probability is in question, the system can escalate the review to a human moderator, or wait for more text inputs from user for further assessment.

Based on these determinations, the system effectively dynamically alters the messaging rules in the user trust matrix based on new learning. This allows the system to quickly stop high-risk text inputs that cause harm.

EXAMPLE

The following is a pseudo code of some of the steps carried out by the message management program when assessing the trustworthiness of a text input:

```
# Pseudo-code example
SLOT_DIVIDER = " "
DICTIONARY = [ . . . ]
player = players.get_player_or_create_new(input.player_id)
slots = phrase.split(SLOT_DIVIDER)
for slot in slots:
    # Loop through all slots and map them to a list of
possible tokens in our dictionary
    # Typically a token is a word marked with its trust
level
    slot.lowercase( )
    slot.remove_symbols( )
    # Consider all possible ngrams that might resolve this
slot
    # Exclude some tokens that would be higher risk based
on a players trust level
    # For example there is too much lexical distance
between fundamentally and fudimentally so
    # only players of higher trust could make that shift.
    slot.tokens = slot.find_potential_grams(DICTIONARY,
player.trust_level)
    # The above will be marked as a token with a
measurement of how much trust is required to use it
    slot.choose_best_token_based_on_player_trust(player)
rules = player.get_rules_for_trust_level( )
```

-continued

```
result = ResultResponse( )
for rule in rules:
    # A rule is as simple as all trust levels must be
below x to pass
        slots.all_tokens_less_than(rule.min_trust_level_required,
player, result)
        slots.no_tokens_worst_than(rule.max_trust_level_required,
player, result)
        # We will want to message the user to either reward or
challenge
        slots.get_message_to_user(rule, player, result)
# Now that we have the results update the player record
result.-
determine_if_message_should_be_allowed_based_on_result(player)
result.update_player(player)
players.save(player)
return result.output_response( )
```

Using a computer system to execute the message management program is important to effectively manage online messaging, as the computing system allows an operator of an online messaging program to quickly and dynamically adjust to the behaviour of users, and prevent harmful messages from reaching other users of the online messaging program While the illustrative embodiments of the present invention are described in detail, it is not the intention of the applicant to restrict or in any way limit the scope of the appended claims to such detail. Additional advantages and modifications within the scope of the appended claims will readily be apparent to those skilled in the art. The invention in its broader aspects is therefore not limited to the specific details, representative apparatus and methods, and illustrative examples shown and described. Accordingly, departures may be made from such details without departing from the spirit or scope of the general concept.

What is claimed is:

1. A computer-implemented method for use with an online communication program, the method comprising: (a) receiving a text input submission from the online communication program, the text input submission having been submitted to the online communication program by a user, the online communication program being operable to display the text input submission to other users; (b) using a processor to determine that the text input submission falls within a certain location on a continuum of trustworthiness comprising at least three group trust values, including first, second, and third groups of trust values, the first group of trust values being associated with acceptable behavior, the second group of trust values being associated with indeterminate or situationally determinate behavior, and the third group of trust values being associated with unacceptable behavior; (c) using the processor to assign an assigned trust value to the text input submission based on the determined certain location, wherein the assigned trust value is a trust value on the continuum of trustworthiness; (d) using the processor to obtain a user trust matrix associated with the user, and a trust level associated with the user; using the processor to determine available responses to the text input submission based on the assigned trust value and at least one allowable trust value associated with the user, the alt least one allowable trust value being specified by rules in the user trust matrix, the at least one allowable trust value being selected based on the trust level of the user, the available responses being determined based on whether the assigned trust value matches the at least one allowable trust value; (f) transmitting, to the online communication program, a response to the text input submission selected from the determined available responses, wherein the responses comprises an instruction to the online communication program to display the text input submission to the other users if the assigned trust value matches the at least one allowable trust value, or an instruction to the online communication program no the display the text input submission to the other users if the assigned trust value does not match the at least one allowable trust value; and (g) adjusting the rules of the user trust matrix based on the assigned trust value of the text input submission, thereby adjusting the at least one allowable trust values as a function of the assigned trust value of the text input submission, wherein the adjusting comprises adjusting the user trust matrix between a more-trusted trust level and a less-trusted trust level, wherein the more-trusted trust level is associated with the adjusted rules of the user trust matrix allowing display of text received from the online communication program when the text has been assigned an assigned trust value belonging to the first or second group of trust values and denying display of the text when the text has been assigned an assigned trust value belonging to the third group of values, and wherein the less-trusted trust level is associated with the adjusted rules of the user trust matrix allowing display of the text when the text has been assigned an assigned trust value belonging to the first group of trust values and denying the text when the text has been assigned an assigned trust value belonging to the second or third group of trust values.

2. A method as claimed in claim 1 further comprising communicating with an online communication program administration server to receive the text input submission and to transmit the response, wherein the server administers the online communication program.

3. A method as claimed in claim 1 further comprising associating the user trust matrix with a default trust level when the user is a new user, the default trust level being associated with a trust matrix having rules that only allow display of text inputs having a trust value associated with acceptable behaviour.

4. A method as claimed in claim 1 wherein using the processor to assign the assigned trust value to the text input submission comprises parsing the text input submission into slots, associating one or more n-grams with one or more of the slots ("parsed n-grams"), assigning a trust value to one or more of the parsed n-grams, then assigning a trust value to the text input submission based on the assigned trust value of one or more of the parsed n-grams.

5. A method as claimed in claim 4 wherein assigning the trust value to one or more parsed n-grams comprises providing a list of defined n-grams each having an associated trust value, assigning the associated trust value of a defined n-gram that matches a parsed n-gram and assigning the second trust value to a parsed n-gram when no match is found.

6. A method as claimed in claim 5 wherein parsing the text input submission comprises normalizing one or more n-grams in the text input submission.

7. A method as claimed in claim 4 wherein using the processor to assign the assigned trust value to the text input submission further comprises parsing the text input submission into slots, associating a unigram to each slot ("parsed unigram"), associating an n-gram to a groups of slots ("parsed n-gram"), assigning a trust value to one or more unigrams or other n-grams, then assigning a trust value to the text input submission based on the assigned trust value of one or more parsed unigrams or other n-grams.

8. A method as claimed in claim 7 wherein using the processor to assign the assigned trust value to the text input submission further comprises determining a usage context of the text input submission, assigning a confidence value based on the determined usage context, and assigning a trust value to the text input submission based on the assigned confidence value.

9. A method as claimed in claim 1 further comprising determining a probability that the text input submission falls within the certain location on the continuum of trustworthiness using the natural language processing technique, then determining the available responses to the text input submission based on the determined probability and the rules of the user trust matrix.

10. A method as claimed in claim 1 wherein the rules of the user trust matrix are adjusted when the user submits text input having a specified trust value a specified number of times.

11. A method as claimed in claim 6 wherein the step of normalizing one or more n-grams comprises selecting a normalization algorithm from a group of normalization algorithms each having a specified chance of error, wherein the selected normalization algorithm is based on the user's trust level.

12. A method as claimed in claim 1 further comprising providing multiple continuums of trustworthiness comprising a general continuum of trustworthiness having at least three groups of general trust values and at least one topical continuum of trustworthiness having at least three groups pf topical trust values; and assigning a general trust value and one or more topical trust values to the text input submission.

13. A method as claimed in claim 12 wherein the user trust matrix comprises rules allowing display of the text input submission when the assigned trust value of the text input submission corresponds to one or more specified allowable general or topical trust values.

14. A non-transitory computer readable medium having stored thereon program code executable by a processor to perform a method comprising: (a) receiving a text input submission from an online communication program, the text input submission having been submitted to the online commination program by a user, the online communication program being operable to display the text input submission to other users; (b) using a processor to determine that the text input submission falls within a certain location on a continuum of trustworthiness comprising at least three group trust values, including first, second, and third groups of trust values, the first group of trust values being associated with acceptable behavior, the second group of trust values being associated with indeterminate or situationally determinate behavior, and the third group of trust values being associated with unacceptable behavior; (c) using the processor to assign an assigned trust value to the text input submission based on the determined certain location, wherein the assigned trust value is a trust value on the continuum of trustworthiness; (d) using the processor to obtain a user trust matrix associated with the user, and a trust level associated with the user; (e) using the processor to determine available responses to the text input submission based on the assigned trust value and at least one allowable trust value associated with the user, the alt least one allowable trust value being specified by rules in the user trust matrix, the at least one allowable trust value being selected based on the trust level of the user, the available responses being determined based on whether the assigned trust value matches the at least one allowable trust value; (f) transmitting, to the online communication program, a response to the text input submission selected from the determined available responses, wherein the responses comprises an instruction to the online communication program to display the text input submission to the other users if the assigned trust value matches the at least one allowable trust value, or an instruction to the online communication program no the display the text input submission to the other users if the assigned trust value does not match the at least one allowable trust value; and (g) adjusting the rules of the user trust matrix based on the assigned trust value of the text input submission, thereby adjusting the at least one allowable trust values as a function of the assigned trust value of the text input submission, wherein the adjusting comprises adjusting the user trust matrix between a more-trusted trust level and a less-trusted trust level, wherein the more-trusted trust level is associated with the adjusted rules of the user trust matrix allowing display of text received from the online communication program when the text has been assigned an assigned trust value belonging to the first or second group of trust values and denying display of the text when the text has been assigned an assigned trust value belonging to the third group of values, and wherein the less-trusted trust level is associated with the adjusted rules of the user trust matrix allowing display of the text when the text has been assigned an assigned trust value belonging to the first group of trust values and denying the text when the text has been assigned an assigned trust value belonging to the second or third group of trust values.

15. A non-transitory computer readable medium as claimed in claim 14 wherein the rules of the user trust matrix are adjusted when the user submits text input having a specified trust value a specified number of times.

16. A computer system for use with an online communication program, the system comprising: (a) a network communication device configured to communicate with a user computing device or online communication program administration server to receive a text input submission submitted by a user and to send a response to the user based on the text input submission; (b) a processor; and (c) a memory having stored thereon program code executable by the processor to perform a method comprising: (i) receiving the text input submission from the online communication program, the text input submission having been submitted to the online commination program by the user, the online communication program being operable to display the text input submission to other users; (ii) using a processor to determine that the text input submission falls within a certain location on a continuum of trustworthiness comprising at least three group trust values, including first, second, and third groups of trust values, the first group of trust values being associated with acceptable behavior, the second group of trust values being associated with indeterminate or situationally determinate behavior, and the third group of trust values being associated with unacceptable behavior; (iii) using the processor to assign an assigned trust value to the text input submission based on the determined certain location, wherein the assigned trust value is a trust value on the continuum of trustworthiness; (iv) using the processor to obtain a user trust matrix associated with the user, and a trust level associated with the user; (v) using the processor to determine available responses to the text input submission based on the assigned trust value and at least one allowable trust value associated with the user, the alt least one allowable trust value being specified by rules in the user trust matrix, the at least one allowable trust value being selected based on the trust level of the user, the available responses being determined based on whether the assigned trust value matches the at least one allowable trust value; (vi) transmitting, to the online communication program, a response to the text input submission selected from the determined available responses, wherein the responses comprises an instruction to the online communication program to display the text input submission to the other users if the assigned trust value matches the at least one allowable trust value, or an instruction to the online communication program no the display the text input submission to the other users if the assigned trust value does not match the at least one allowable trust value; and (vii) adjusting the rules of the user trust matrix based on the assigned trust value of the text input submission, thereby adjusting the at least one allowable trust values as a function of the assigned trust value of the text input submission, wherein the adjusting comprises adjusting the user trust matrix between a more-trusted trust level and a less-trusted trust level, wherein the more-trusted trust level is associated with the adjusted rules of the user trust matric allowing display of text received from the online communication program when the text has been assigned an assigned trust value belonging to the first or second group of trust values and denying display of the text when the text has been assigned an assigned trust value belonging to the third group of values, and wherein the less-trusted trust level is associated with the adjusted rules of the user trust matrix allowing display of the text when the text has been assigned an assigned trust value belonging to the first group of trust values and denying the text when the text has been assigned an assigned trust value belonging to the second or third group of trust values.

17. A system as claimed in claim 16 wherein the rules of the user trust matrix are adjusted when the user submits text input having a specified trust value a specified number of times.

* * * * *